United States Patent
Selin et al.

(10) Patent No.: US 9,346,102 B2
(45) Date of Patent: May 24, 2016

(54) METAL CUTTING TURNING INSERT AND A TURNING TOOL

(71) Applicant: SANDVIK INTELLECTUAL PROPERTY AB, Sandviken (SE)

(72) Inventors: Erik Selin, Sandviken (SE); Ronnie Lof, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 210 days.

(21) Appl. No.: 14/315,617

(22) Filed: Jun. 26, 2014

(65) Prior Publication Data
US 2015/0003923 A1 Jan. 1, 2015

(30) Foreign Application Priority Data
Jun. 27, 2013 (EP) .................................... 13173982

(51) Int. Cl.
| | |
|---|---|
| B23B 27/22 | (2006.01) |
| B23B 27/00 | (2006.01) |
| B23B 27/14 | (2006.01) |
| B23B 27/16 | (2006.01) |
| B23C 5/02 | (2006.01) |

(52) U.S. Cl.
CPC ............ *B23B 27/005* (2013.01); *B23B 27/143* (2013.01); *B23B 27/1659* (2013.01); *B23B 2200/0447* (2013.01); *B23B 2200/086* (2013.01); *Y10T 407/22* (2015.01); *Y10T 407/24* (2015.01)

(58) Field of Classification Search
CPC ..................... B23C 2200/08; B23C 2200/081; B23C 2200/087; B23C 2200/20; B23C 2200/32; B23C 2200/323; B23C 2200/326; B23B 27/143; B23B 220/323; B23B 220/081; B23B 220/321
See application file for complete search history.

(56) References Cited

U.S. PATENT DOCUMENTS

| | | | |
|---|---|---|---|
| 4,465,412 A | 8/1984 | Zweekly | |
| 8,342,779 B2 * | 1/2013 | Kobayashi | ............ B23B 27/143 407/113 |

(Continued)

FOREIGN PATENT DOCUMENTS

| | | |
|---|---|---|
| EP | 0364421 A1 | 4/1990 |
| KR | 2001 0011938 A | 2/2001 |

(Continued)

*Primary Examiner* — Will Fridie, Jr.
(74) *Attorney, Agent, or Firm* — Corinne R. Gorski

(57) ABSTRACT

A cutting insert for turning includes an upper side, a lower side, a clearance surface connecting the upper side and the lower side, and an upper cutting edge. The upper cutting edge forms a primary edge portion and a secondary edge portion connected by a nose edge portion. On the upper side, a chip former is formed, including a nose bottom surface formed behind the nose edge portion, a primary main bottom surface extending along the primary edge portion, and, between the nose bottom surface and the primary main bottom surface, a continuous primary elevated bottom surface extending along the primary edge portion, having a lowest point lower than the level of the primary edge portion but higher than the lowest point of each of the nose bottom surface and the primary main bottom surface.

20 Claims, 9 Drawing Sheets

(56) References Cited

U.S. PATENT DOCUMENTS

| | | | | |
|---|---|---|---|---|
| 8,585,330 B2 * | 11/2013 | Yamazaki | ............. | B23B 27/143 407/113 |
| 8,690,496 B2 * | 4/2014 | Komatsuka | ........... | B23B 27/141 407/113 |
| 8,814,480 B2 * | 8/2014 | Cohen | ................... | B23B 27/143 407/113 |
| 8,876,441 B2 * | 11/2014 | Majima | ................ | B23B 27/143 407/113 |
| 2005/0019111 A1 * | 1/2005 | Kitagawa | ............. | B23B 27/141 407/113 |
| 2011/0038677 A1 * | 2/2011 | Sung | ........................ | B23C 5/06 407/48 |
| 2012/0198973 A1 | 8/2012 | Schleinkofer et al. | | |
| 2012/0230785 A1 * | 9/2012 | Chen | ..................... | B23B 27/141 407/114 |
| 2013/0064613 A1 | 3/2013 | Krishtul | | |

FOREIGN PATENT DOCUMENTS

| | | |
|---|---|---|
| WO | 2006007607 A1 | 1/2006 |
| WO | 2013146899 A1 | 10/2013 |

\* cited by examiner

METAL CUTTING TURNING INSERT AND A TURNING TOOL

RELATED APPLICATION DATA

This application claims priority under 35 U.S.C. §119 to EP Patent Application No. 13173982.3, filed on Jun. 27, 2013, which the entirety thereof is incorporated herein by reference.

TECHNICAL FIELD

The present invention relates to a cutting insert configured for chip-removing machining of a metallic work piece by means of turning. The present invention also relates to a turning tool including a tool body and at least one such cutting insert.

BACKGROUND

US 2012/0198973 discloses an indexable cutting insert configured for machining a metallic work piece by means of turning. The cutting insert includes an insert body having an upper side defining an upper extension plane, a lower side defining a lower extension plane parallel thereto, wherein a center axis extends perpendicularly through the upper extension plane and the lower extension plane. A clearance surface extends around the periphery of the insert body and connects the upper side and the lower side. A cutting edge is formed between the clearance surface and the upper side and extends around the upper side. The cutting edge forms a primary edge portion and a secondary edge portion connected by a nose edge portion such that the secondary edge portion is formed at an angle towards the primary edge portion. The upper side of the insert body includes a chip former with a nose bottom surface formed behind the nose edge portion along a bisector between the primary edge portion and the secondary edge portion. The nose bottom surface has a lowest point lower than the level of the nose edge portion. The chip former further includes a primary main bottom surface extending along the primary edge portion and having a lowest point lower than the level of the primary edge portion.

The cutting insert of US 2012/0198973 has a chip geometry in the corner area, including an elevated surface in the form of a step formed behind the nose bottom surface along the bisector. The elevated surface has a lowest point lower than the level of the primary edge portion but higher than the lowest point of each of the nose bottom surface and the primary main bottom surface. The elevated surface is formed symmetrically with respect to the bisector, such that part of the elevated surface is located in a region between the nose bottom surface and the primary main bottom surface, and part of the elevated surface is located between the nose bottom surface and a secondary main bottom surface extending along the secondary edge portion. Behind the elevated surface along the bisector, a further elevated chip geometry is formed. The cutting insert thus provides chip geometries at different levels in the region of the cutting corner.

The cutting insert of US 2012/0198973 thus provides chip control for different feed rates, wherein the different chip geometries are being used depending on feed rate. However, when used for chip-removing machining of a work piece by means of turning, the cutting insert gives hard chip forming, i.e. chips with a small radius of curvature are formed. This reduces the tool life due to the high deformation forces thus exerted.

SUMMARY

It is an aspect of the present disclosure to overcome the problems discussed above and to provide a cutting insert for turning, which cutting insert provides soft chip forming while still offering good chip control. Another aspect is to provide a versatile cutting insert which is easy to optimise for different cutting depths and feed rates. Still another aspect is to provide a cutting insert which is, for at least some cutting conditions, less susceptible to notch wear.

These aspects are achieved by the cutting insert initially defined, wherein the chip former further includes a continuous primary elevated bottom surface formed between the nose bottom surface and the primary main bottom surface. The primary elevated bottom surface extends along the primary edge portion and the primary elevated bottom surface has a lowest point lower than the level of the primary edge portion, but higher than the lowest point of each of the nose bottom surface and the primary main bottom surface.

The chip former thus includes a primary elevated bottom surface extending along the primary edge portion. "Along" as used herein is to be understood as when the cutting insert is seen in a direction parallel to the center axis, i.e. from above. The primary elevated bottom surface has an extension in a direction perpendicular to the primary edge portion, i.e., it extends in at least two directions. The lowest point in a region along the primary edge portion and between the nose bottom surface and the primary bottom surface is located on the primary elevated bottom surface. In other words, the primary elevated bottom surface forms a single continuous bottom surface without any further and lower (i.e. bottom) surfaces situated in the region along the primary edge portion and between the nose bottom surface and the primary bottom surface where the primary elevated bottom surface is situated. Such a cutting insert provides soft chip formation, giving chips with a relatively large radius of curvature and thus an open chip shape. This is valid for a large range of cutting depths and feed rates, and particularly useful for cutting depths slightly above the nose radius of the cutting insert and for relatively large feed rates used for rough turning. Since the soft chip formation achieved reduces the deformation forces exerted on the insert, the tool life is prolonged.

The cutting insert according to the present disclosure is also less susceptible to notch wear, which is particularly problematic when working with ductile materials such as stainless steels and heat resistant materials. For these materials, a burr tends to form on the chip, which burr may cause damage to the primary cutting edge, i.e. notch wear, if the radius of curvature of the chip is small. This is generally the case for cutting depths slightly above the nose radius.

The cutting insert according to the disclosure reduces these problems due to the primary elevated bottom surface, which increases the radius of curvature of the chip. For cutting depths much over the nose radius, there are generally less problems with notch wear, but on the other hand, the chip may at those cutting depths cause damages to the work piece. The elevated bottom surface at those cutting depths helps direct the chip away from the work piece and thereby minimizes damage to the work piece. At small cutting depths, i.e. cutting depths smaller than the nose radius, the chip tends to be directed approximately along the bisector of the cutting insert. The primary elevated bottom surface forms for these cutting depths a chip former which gives better chip control.

According to one embodiment of the disclosure, the primary elevated bottom surface is a planar or substantially planar surface. The primary elevated bottom surface can in this embodiment extend in a plane parallel to the upper extension plane, but also in a plane inclined to the upper extension plane. The cutting insert according to this embodiment generally provides soft chip formation, since the chip can be in contact with the primary elevated bottom surface during a metal cutting operation. This increases the tool life of the cutting insert.

According to another embodiment of the disclosure, the primary elevated bottom surface includes chip forming surface structure such as ridges, grooves, protrusions, pits or the like. By means of such chip forming surface structure, the chip formation may be optimised for various working conditions. Chip forming surface structure is particularly advantageous for small feed rates in order to give increased chip control. For example, the surface structure may be designed to give corrugated chips which are easier to break, thus resulting in shorter chips. The chip forming surface structure should not deviate much from a main extension plane of the primary elevated bottom surface in a direction parallel to the centre axis. Preferably, the chip forming surface structure does not deviate from the main extension plane of the primary elevated bottom surface in said direction by more than 25%, more preferably 10%, of the distance from the level of the primary edge portion to the level of the main extension plane of the primary elevated bottom surface. For a primary elevated bottom surface extending in a main extension plane parallel to the upper extension plane and with a distance of 0.10 mm between the main extension plane and the level of the primary edge portion, the chip forming surface structure thus preferably deviates by maximum ±0.025 mm from the main extension plane, more preferably by maximum ±0.010 mm.

According to yet another embodiment of the disclosure, the primary elevated bottom surface has a main extension plane in a plane parallel to the upper extension plane. Such a primary elevated bottom surface may also include chip forming surface structure deviating from the main extension plane. Keeping the main extension plane parallel to the upper extension plane provides chips which are reasonably short at the same time as the tool life of the cutting insert is acceptable.

According to still another embodiment, the primary elevated bottom surface has a main extension plane in a plane which is inclined with respect to the upper extension plane. The main extension plane may for instance be inclined with respect to the primary edge portion such that the primary elevated bottom surface has its highest point closest to the nose bottom surface and its lowest point closest to the primary main bottom surface. With such a design, the chips are directed outwards from the work piece and the risk that the work piece is scratched by detaching chips is reduced. This is particularly advantageous for sensitive materials at large cutting depths. If the main extension plane is instead inclined with respect to the primary edge portion such that the primary elevated bottom surface has its lowest point closest to the nose bottom surface and its highest point closest to the primary main bottom surface, notch wear may be reduced e.g. during machining of work pieces made of high temperature alloys.

The main extension plane may in another embodiment be inclined in a plane parallel to the primary edge portion such that the primary elevated bottom surface has its lowest point closest to the primary edge portion and its highest point closer to the centre axis. In this case, the chips become shorter, which may be advantageous for certain applications. The main extension plane may instead be inclined in a plane parallel to the primary edge portion such that the primary elevated bottom surface has its highest point closest to the primary edge portion and its lowest point closer to the centre axis. Such a configuration gives chips with a larger radius of curvature and thus increases the tool life of the cutting insert. In one embodiment, the main extension plane is inclined both with respect to the primary edge portion and with respect to the secondary edge portion.

According to another embodiment of the disclosure, the primary elevated bottom surface has a tetragonal or substantially tetragonal shape when seen in a direction parallel to the center axis. Such a primary elevated bottom surface could for example be rectangular or in the form of a parallelogram. It provides a uniform surface over which the chip is formed and thereby results in less friction, prolonging tool life and providing lower sound levels.

According to yet another embodiment of the disclosure, the primary elevated bottom surface has at least one borderline oriented parallel or substantially parallel to the primary edge portion. In this embodiment, the chip formation is uniform over at least that borderline which is oriented parallel or substantially parallel to the primary edge portion, but it is possible to twist the chip using the other borderline. Preferably, the primary elevated bottom surface has two borderlines oriented parallel or substantially parallel to the primary edge portion, giving a uniform chip formation. Such an elevated bottom surface could for example be rectangular or substantially rectangular or in the form of a parallelogram, but it could also include one or more curved borderlines or a total of more than four borderlines.

According to yet another embodiment, the primary elevated bottom surface is located in a region outside of a circular sector centred on the bisector, the circular sector having the nose radius r of the nose edge portion as its radius and a central angle θ, wherein the central angle θ is chosen such that the nose bottom surface is located at least partly within the circular sector. The area behind the nose bottom surface can thus be formed independently of the primary elevated bottom surface. A corresponding secondary elevated bottom surface, extending along the secondary edge portion, may thus be formed spaced apart from the primary elevated bottom surface. In this embodiment, the chip former may be optimised separately on each side of the primary elevated bottom surface, i.e. in the nose region and in the region of the primary edge portion respectively. The cutting insert is thus very versatile since the same individual chip former can be optimised for different cutting depths, materials and feed rates.

According to still another embodiment, in a direction parallel to the center axis, the distance $d_1$ from the level of the primary edge portion to the lowest point of the primary elevated bottom surface is 0.2 to 0.8 times the distance $d_2$ from the level of the primary edge portion to the lowest point of the nose bottom surface, preferably 0.3 to 0.6 times and even more preferably 0.4 to 0.6 times. Within these intervals, the chip forming properties of the primary elevated bottom surface are optimized. When the distance $d_1$ from the level of the primary edge portion to the lowest point of the primary elevated bottom surface is more than 0.2 times the distance $d_2$ from the level of the primary edge portion to the lowest point of the nose bottom surface, i.e. the primary elevated bottom surface is not too close to the level of the primary edge portion, problems with friction upon chip formation are reduced. When the distance $d_1$ from the level of the primary edge portion to the lowest point of the primary elevated bottom surface is less than 0.8 times the distance $d_2$ from the level of the primary edge portion to the lowest point of the nose bottom surface, i.e. the primary elevated bottom surface is not too close to the level of the nose bottom surface, the primary elevated bottom surface provides softer chip formation. For example, depending on the size of the cutting insert, the distance $d_2$ from the level of the primary edge portion to the lowest point of the nose bottom surface may be in the range 0.12 to 0.25 mm and the distance $d_1$ from the level of the primary edge portion to the lowest point of the primary elevated bottom surface may be in the range 0.05 to 0.1 mm.

According to an embodiment of the disclosure, in a direction parallel to the center axis, the distance $d_3$ from the level of the primary edge portion to the highest point of the primary elevated bottom surface is 0.2 to 0.8 times the distance $d_2$ from the primary edge portion to the lowest point of the nose bottom surface, preferably 0.3-0.6 times and even more preferably 0.4 to 0.6 times. Thus, the entire elevated bottom surface is located below the level of the primary edge portion. Within the intervals, the chip forming properties of the primary elevated bottom surface are optimized.

According to one embodiment of the invention, the primary elevated bottom surface has its largest extension in a direction parallel to the primary edge portion. The primary elevated bottom surface is thus adapted for different cutting depths.

According to another embodiment, in a plane parallel to the upper extension plane, the shortest distance from the primary edge portion to the primary elevated bottom surface is shorter than the shortest distance from the primary edge portion to the nose bottom surface. This is particularly advantageous during rough turning with large cutting forces, when the primary edge portion is used to a larger extent than during finishing turning with lower feed rates and smaller cutting depths According to yet another embodiment, the chip former further includes a chip forming wall extending in a direction along the primary edge portion and the primary elevated bottom surface is located between the primary edge portion and the chip forming wall. This is particularly relevant for double-sided cutting inserts, i.e. inserts wherein the upper and the lower sides are identically designed and may both be used for machining. In this case the upper side may comprise an elevated support surface for supporting the cutting insert when inserted into a turning tool. The chip forming wall directs the chip away from this elevated support surface. The primary elevated bottom surface thus softens the transition from the primary edge portion to the chip forming wall and provides for softer chip formation. Preferably, the nose bottom surface and the primary main bottom surface are located in a region between the upper cutting edge and the chip forming wall.

According to still another embodiment of the invention, the primary elevated bottom surface and the primary main bottom surface are connected by a primary intermediate bottom surface extending between the primary elevated bottom surface and the primary main bottom surface in a plane which is inclined relatively the upper extension plane. The primary intermediate bottom surface is thus a sloping surface, falling from the level of the primary elevated bottom surface to the level of the primary main bottom surface. The primary intermediate bottom surface thus forms a soft transition between the primary elevated bottom surface and the primary edge bottom surface. The soft transition makes the cutting insert advantageous from a manufacturing point of view.

According to one embodiment of the disclosure, the primary intermediate bottom surface has a width in a direction perpendicular to the primary edge portion, which width decreases in a direction towards the primary main bottom surface.

According to another embodiment of the disclosure, the primary elevated bottom surface extends from within a nose region in the form of a circular sector centred on the bisector and with the nose edge portion as its arc. The primary elevated bottom surface is thus located partly within the nose region, relatively close to the nose bottom surface. The cutting insert is with this configuration very versatile. It offers good chip control for small cutting depths and low feed rates, while it is also suitable for larger cutting depths and higher feed rates.

According to another embodiment of the invention, the primary elevated bottom surface is located outside of a nose region in the form of a circular sector centred on the bisector and with the nose edge portion as its arc. In this embodiment, the cutting insert is optimised for high feed rates and large cutting depths.

According to one embodiment of the disclosure, the nose bottom surface is located at least partly within a nose region in the form of a circular sector centred on the bisector and with the nose edge portion as its arc. According to a further embodiment, the nose bottom surface is entirely located within a nose region in the form of a circular sector centred on the bisector and with the nose edge portion as its arc. This location of the nose bottom surface gives good chip control, particularly for small cutting depths.

According to an embodiment, in a direction parallel to the upper extension plane, the shortest distance between the nose bottom surface and the nose edge portion is less than a nose radius r of the nose edge portion. Such a distance between the nose bottom surface and the nose edge region makes it possible to form a steeply sloping surface from the nose edge portion to the nose bottom surface. This results in shorter chips.

According to another aspect, the above-mentioned objects are achieved by a turning tool including a tool body and at least one cutting insert as described above, wherein each of the at least one metal cutting inserts is detachably mounted in an insert seat of the tool body.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
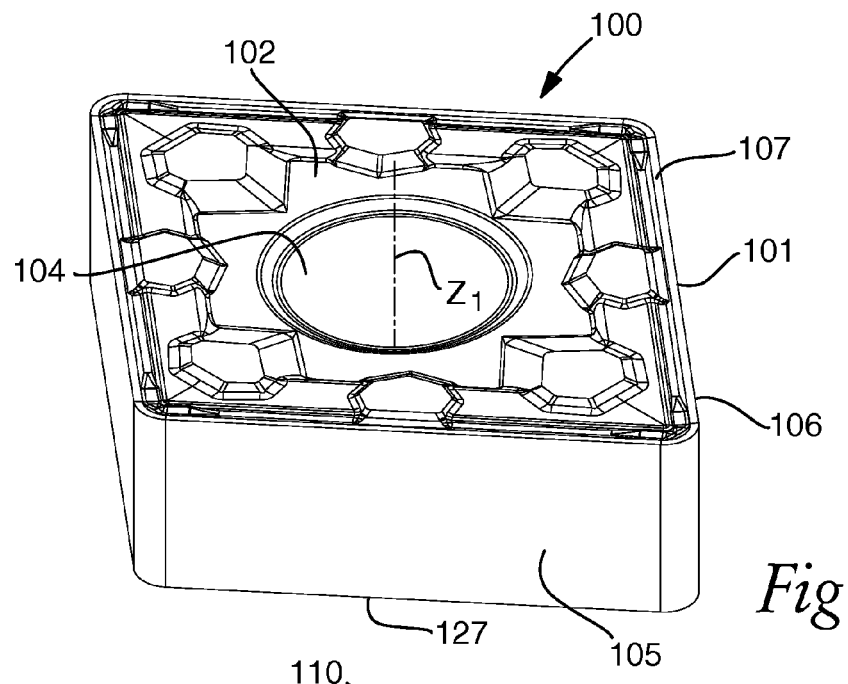
FIG. 1 is a perspective view of a cutting insert according to a first embodiment of the invention.
Figure 2:
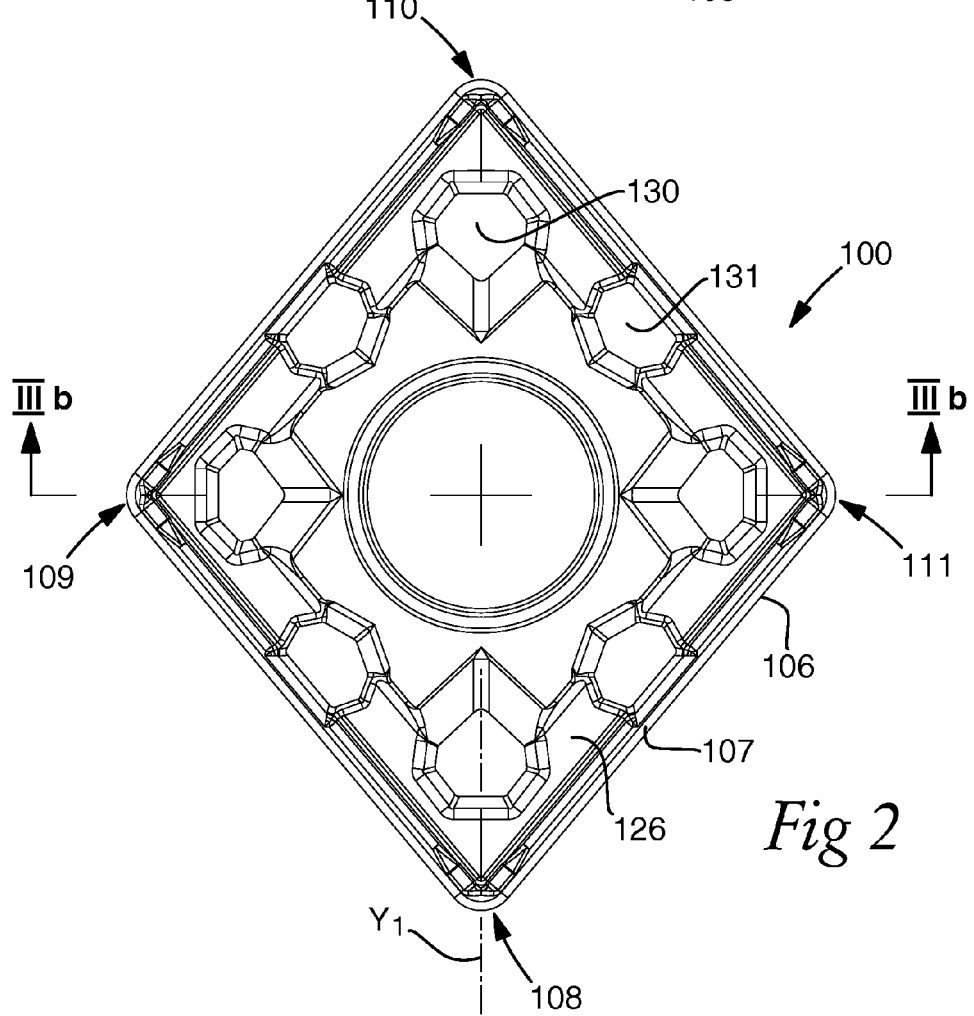
FIG. 2 is a top view of the cutting insert of FIG. 1.
Figure 3A:
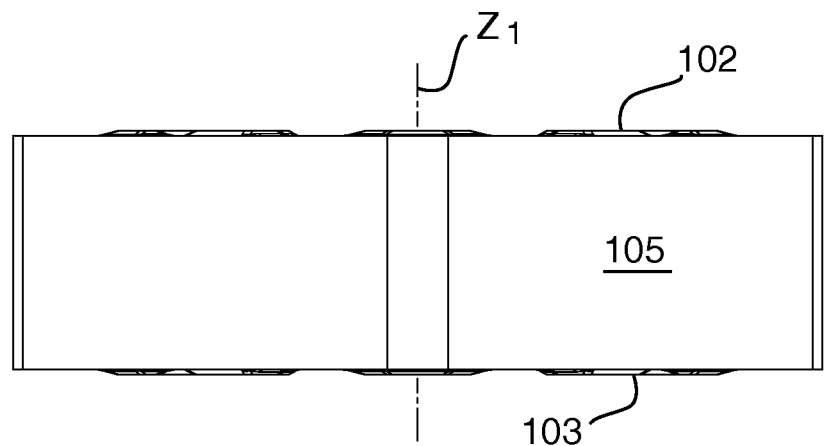
FIG. 3*a* is a side view of the cutting insert of FIG. 1.
Figure 3B:
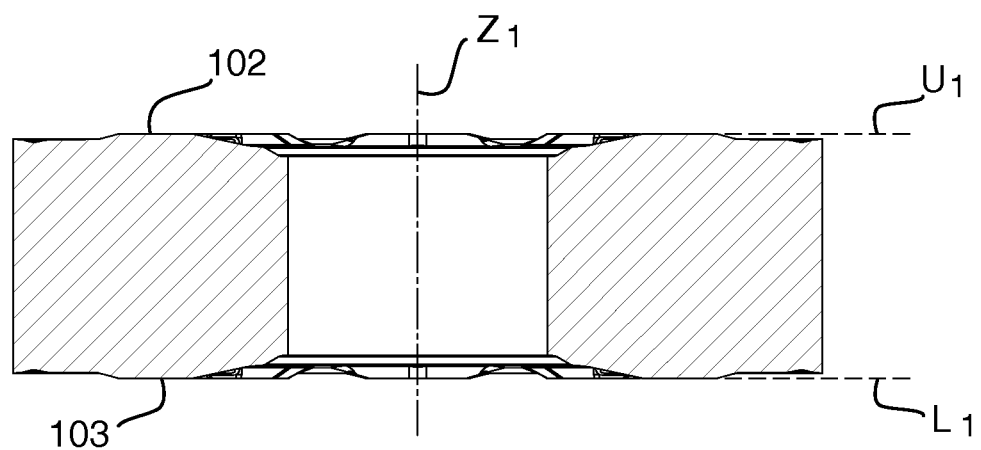
FIG. 3*b* is a cross section of the cutting insert of FIG. 1 taken along line IIIb-IIIb of FIG. 2.

FIGS. 1-3 show a cutting insert 100 according to a first embodiment of the present disclosure.

The cutting insert includes an insert body 101, which is formed with an upper side 102 defining an upper extension plane $U_1$ and a lower side 103 defining a lower extension plane $L_1$, which is parallel to the upper extension plane $U_1$. A center axis $Z_1$ extends perpendicularly through the upper extension plane $U_1$ and the lower extension plane $L_1$, with a positive direction defined from the lower extension plane $L_1$ to the upper extension plane $U_1$. The terms "higher" and "lower" are hereinafter used in relation to the upper extension plane $U_1$ along the center axis $Z_1$. A center hole 104 extends through the upper side 102 and the lower side 103 in parallel and concentrically with the center axis $Z_1$. The upper side 102 and the lower side 103 are formed identically since the cutting insert 100 is double sided and indexable to different index positions. In one index position, an upper cutting edge 106 is cutting, and the upper side 102 forms a chip surface 126. In another index position, a lower cutting edge 127 formed around the lower side 103 is cutting, and the lower side 103 forms a chip surface.

The upper side 102 includes corner support surfaces 130 as well as edge support surfaces 131 configured for resting on the support surface of the seat. The support surfaces 130, 131 extend in the upper extension plane $U_1$. The upper side 102 and the lower side 103 are formed identically, so that also the lower side 103 is formed with corresponding support surfaces extending in the lower extension plane $L_1$. Thus, in the following, only the upper side 102 will be described in detail, but it is to be understood that the lower side 103 includes all the features of the upper side 102.

A clearance surface 105 extends around the periphery of the insert body 101 and connects the upper side 102 and the lower side 103. Between the clearance surface 105 and the upper side 102 the upper cutting edge 106 is formed, extending around the upper side 102. On the upper side 102 extending along the upper cutting edge 106, a land 107 in the form of a bevel is formed. The cutting insert 100 has the general shape of a rhomb with four rounded corners 108, 109, 110, 111 when seen in a top view, i.e. in a direction along the center axis $Z_1$, such as in FIG. 2. Each corner is designed as cutting corners for machining of a work piece by means of turning. The cutting insert is formed symmetrically with respect to a plane parallel to and including the center axis $Z_1$ and two opposite corners 108, 110. The two opposite corners 108, 110 are formed with an acute nose angle while the two opposite corners 109, 111 are formed with an obtuse nose angle. Only one of the corners 108 will be described in further detail below, since all corners have the same design apart from the nose angle.

Figure 4A:
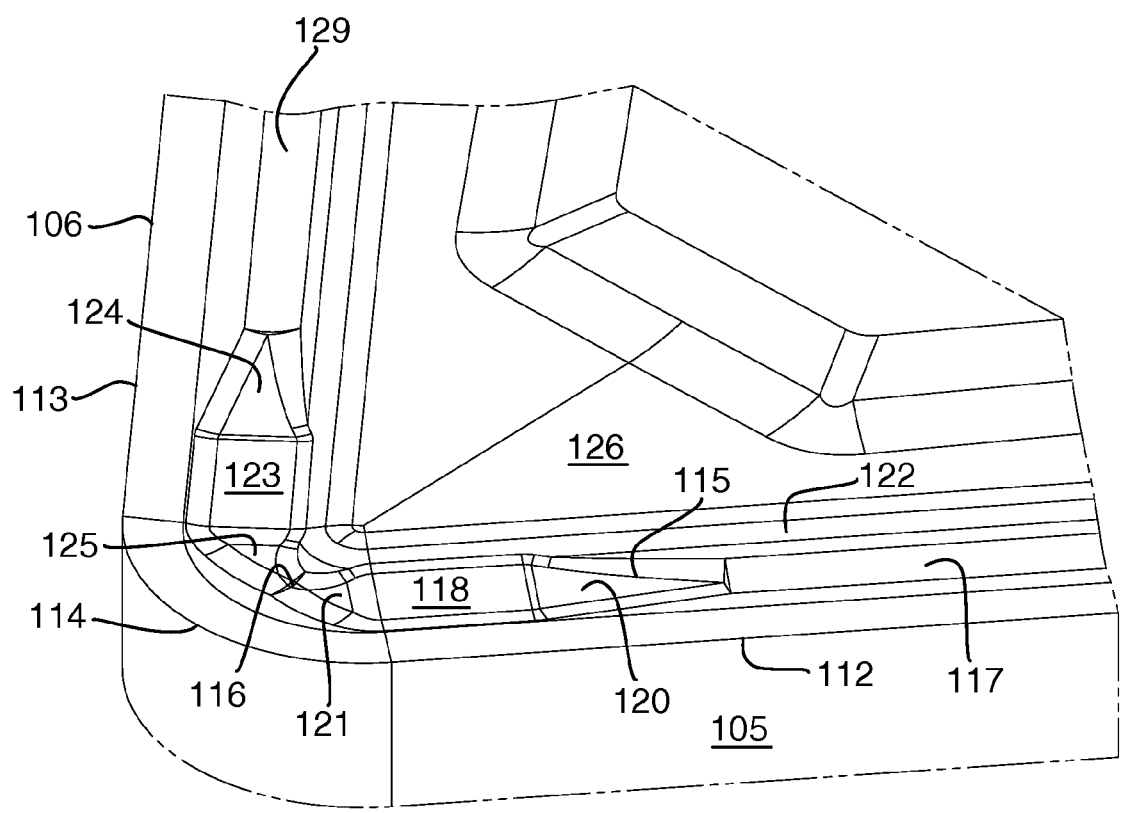
FIG. 4*a* is a perspective view of a corner area of the cutting insert of FIG. 1.
Figure 4B:
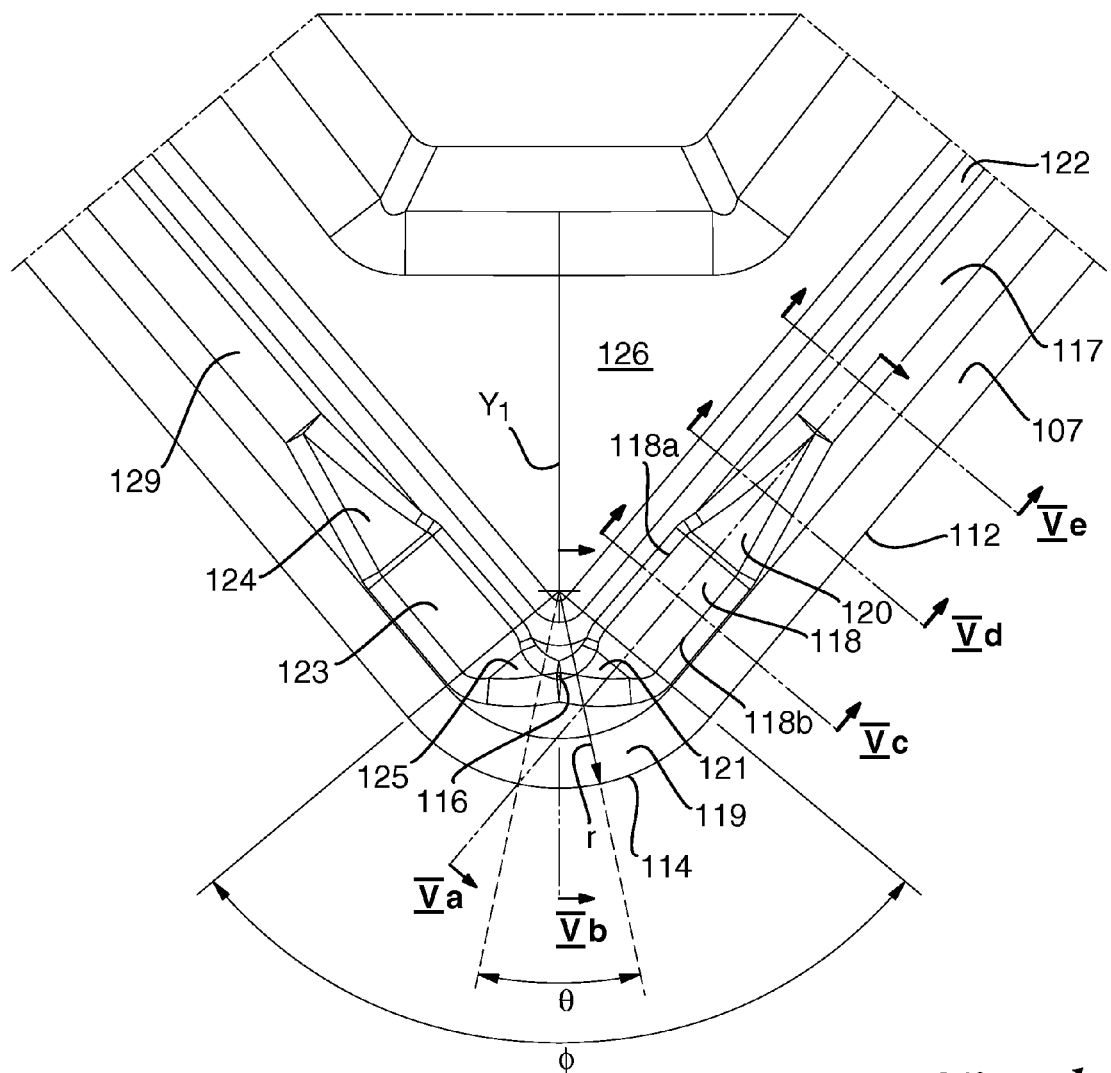
FIG. 4*b* is a top view of the corner area in FIG. 4*a*.

Reference is now made to FIGS. 4a and 4b, showing the corner 108 in greater detail, and FIGS. 5a-e, showing cross sections along the lines shown in FIG. 4b. In the area of the corner 108, the upper cutting edge 106 forms a primary edge portion 112 and a secondary edge portion 113 formed at an angle towards the primary edge portion 112. The primary edge portion 112 and the secondary edge portion 113 are connected by a nose edge portion 114 with a nose radius r, i.e. a radius of curvature. A bisector $Y_1$ crossing the center axis $Z_1$ cuts the nose edge portion 114 in two symmetrical portions.

Figure 5A:
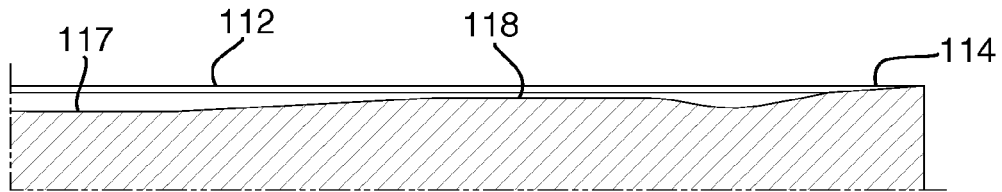
FIG. 5*a* is a schematic cross section along the line Va of FIG. 4*b*.
Figure 5B:
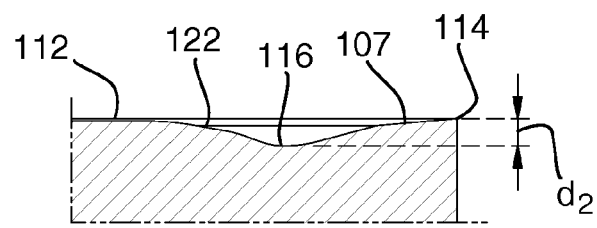
FIG. 5*b* is a schematic cross section along the line Vb of FIG. 4*b*.
Figure 5C:
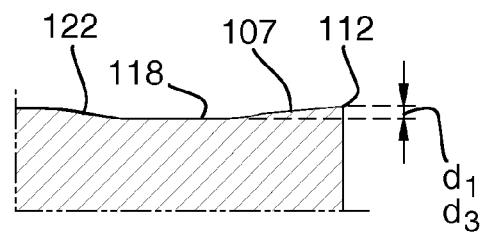
FIG. 5*c* is a schematic cross section along the line Vc of FIG. 4*b*.
Figure 5D:
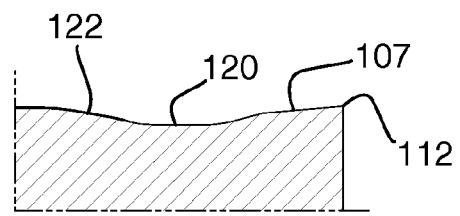
FIG. 5*d* is a schematic cross section along the line Vd of FIG. 4*b*.
Figure 5E:
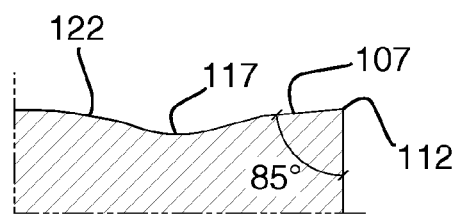
FIG. 5*e* is a schematic cross section along the line Ve of FIG. 4*b*.
Figure 6A:
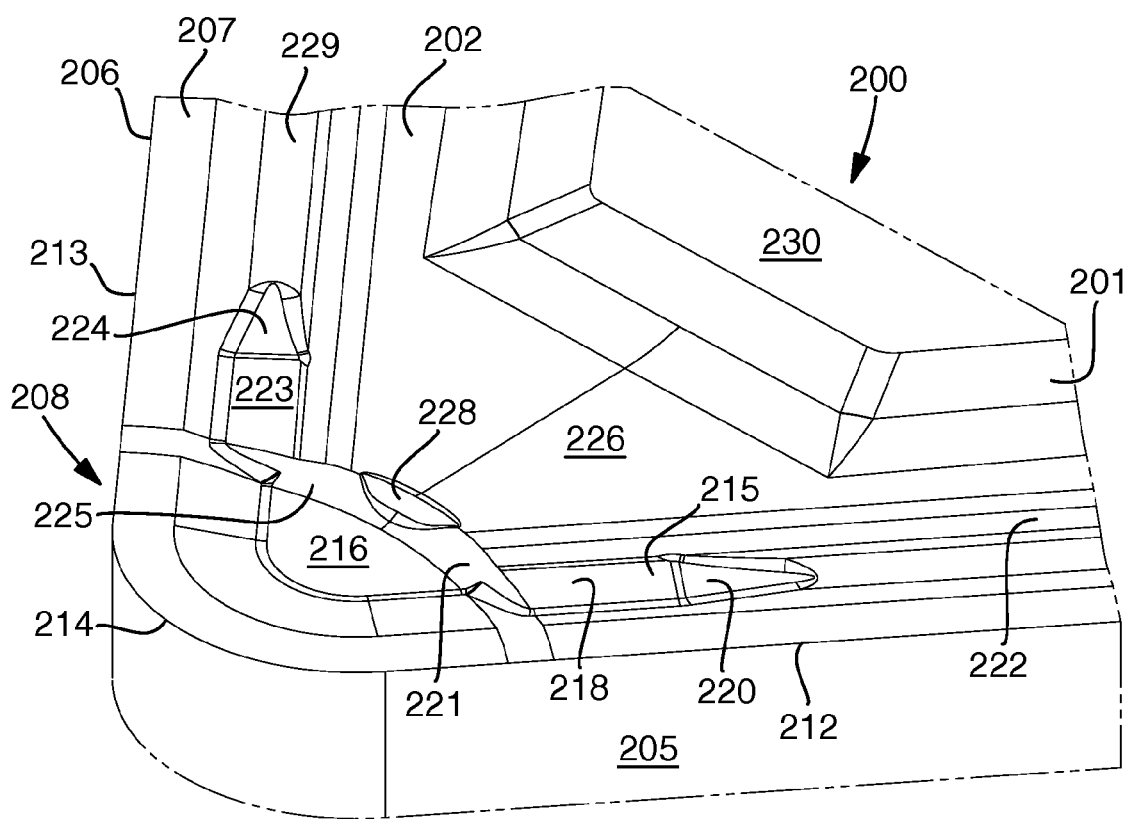
FIG. 6*a* shows a perspective view of a corner area of a cutting insert according to a second embodiment of the invention.
Figure 6B:
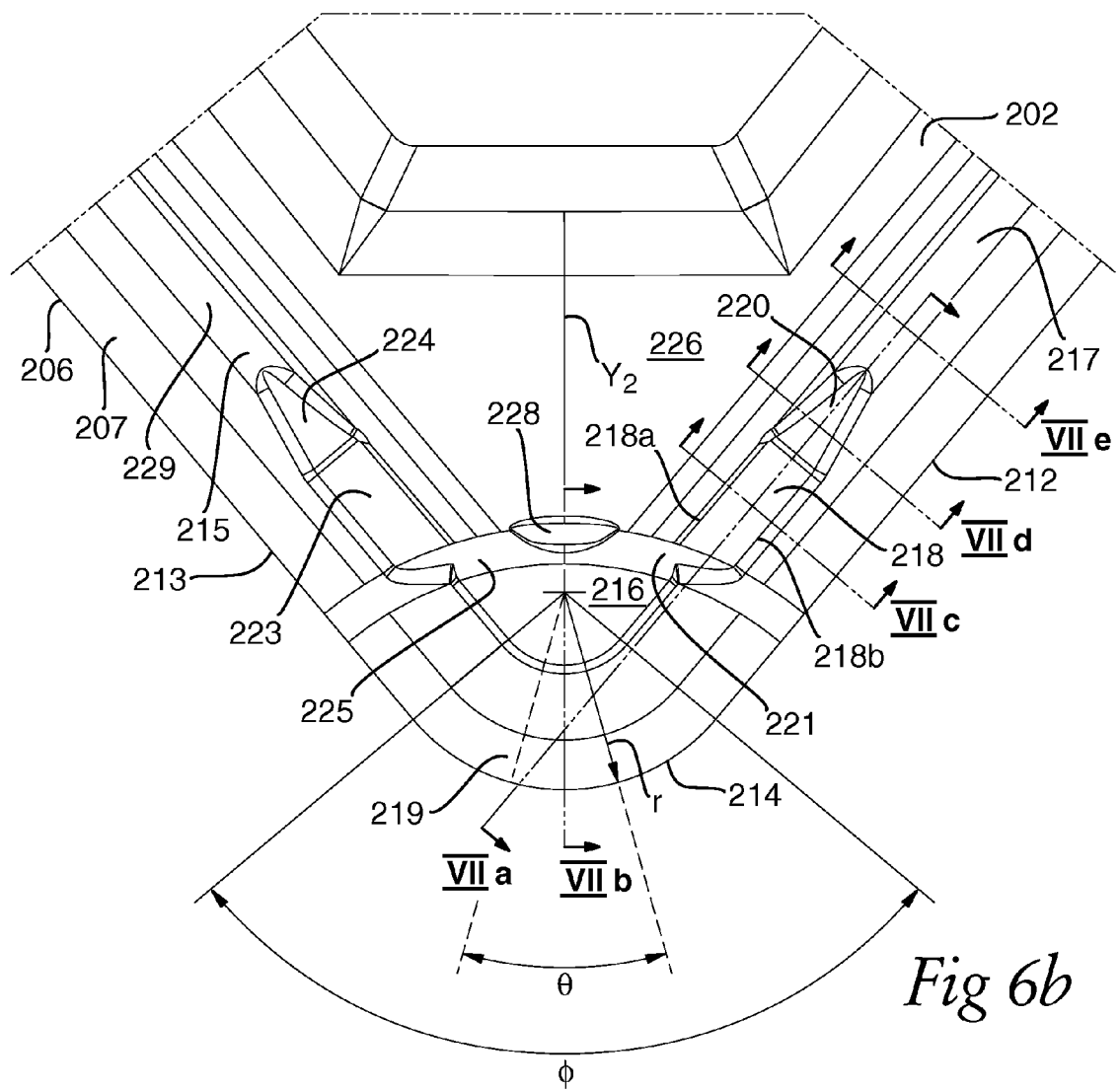
FIG. 6*b* shows a top view of the corner area in FIG. 6*a*.

The corner 108 includes on the upper side 102 a chip former 115 that includes a nose bottom surface 116, a primary main bottom surface 117, and a secondary main bottom surface 129. The nose bottom surface 116 is formed as a continuous surface with a lowest point lower than the level of the nose edge portion 114, as is clear from FIG. 5b. It is formed in the area behind the nose edge portion 114 and the land 107 along the bisector Y1. The primary main bottom surface 117 extends on the inside of the land 107 along the primary edge portion 112. It is formed as a ditch with a lowest level being lower than the level of the primary edge portion 112 as shown in FIG. 5e and approximately at the same level as the nose bottom surface 116. In the region between the nose bottom surface 116 and the primary main bottom surface 117, separated from the bisector $Y_1$ and extending along the primary edge portion 112 on the inside of the land 107, a primary elevated bottom surface 118 is formed. The primary elevated bottom surface 118 has, as shown in FIGS. 5a and 5c, its lowest level lower than the primary edge portion 112 and the nose edge portion 114, but higher than the lowest point of each of the nose bottom surface 116 and the primary bottom surface 117.

In the first embodiment, the primary elevated bottom surface 118 is in the form of a substantially planar surface extending in a main extension plane parallel to the upper extension plane $U_1$. It has two borderlines 118a, 118b being essentially parallel to the primary edge portion 112. The primary elevated bottom surface 118 thus has an extension in a direction perpendicular to the primary edge portion 112. The primary elevated bottom surface 118 extends from within a nose region 119 of the cutting insert, wherein the nose region 119 is defined as a circular sector with a central nose region angle φ, centered on the bisector $Y_1$ and with the nose edge portion 114 as its arc. The nose radius r of the nose edge portion 114 is thus the same as the radius of the circular sector defining the nose region 119. The primary elevated bottom surface 118 extends from within the nose region 119 and to a region outside of the nose region 119 along the primary edge portion 112. The extension of the primary elevated bottom surface 118 is larger in a direction parallel to the primary edge portion 112 than in a direction perpendicular to the primary edge portion 112.

Connecting the primary elevated bottom surface 118 and the primary main bottom surface 117 there is a primary intermediate bottom surface 120. The primary intermediate bottom surface 120 is formed as a tapered surface with a width in a direction perpendicular to the primary edge portion 112, which decreases in a direction towards the primary main bottom surface 117. The primary intermediate bottom surface 120 extends in an inclined plane extending from the primary elevated bottom surface 118 to the primary main bottom surface 117. Connecting the nose bottom surface 116 and the primary elevated bottom surface 118 there is a primary connection surface 121. The primary connection surface 121 is here in the form of a curved surface. The chip former 115 further includes a chip forming wall 122 extending in the region between bottom surfaces 116, 117, 118, 120, 121 and a chip surface 126 formed at a level slightly below the upper extension plane $U_1$. In this embodiment, the upper cutting edge 106 is at the level of the chip surface 126 and the chip forming wall 122 is in the form of a sloping surface. The chip forming wall 122 therefore does not rise above the upper cutting edge 106, as can be seen in FIGS. 5b-e.

The chip former 115 is symmetrical with respect to the bisector $Y_1$. It is thus formed with secondary main bottom surface 129, a secondary elevated bottom surface 123 as well as a secondary intermediate bottom surface 124 and a secondary connection surface 125 configured in the same way as the primary elevated bottom surface 118, the primary intermediate bottom surface 120 and the primary connection surface 121.

A corner 208 of a cutting insert 200 according to a second embodiment of the present invention is shown in FIGS. 6a-b and FIGS. 7a-e. The cutting insert 200 according to this second embodiment differs from the cutting insert 100 according to the first embodiment in that it is provided with a chip former 215 with a different design than the chip former 115. The cutting insert 200 is formed with an insert body 201 with an upper cutting edge 206, a clearance surface 205 and a land 207 extending on an upper side 202. An upper extension plane of the cutting insert 200 is defined as the plane in which support surfaces 230 of the cutting insert extends.

In the area of the corner 208, the upper cutting edge 206 forms a primary edge portion 212 and a secondary edge portion 213 formed at an angle towards the primary edge portion 212. The primary edge portion 212 and the secondary edge portion 213 are connected by a nose edge portion 214 with a radius of curvature r. A bisector $Y_2$ crossing a center axis of the cutting insert 200 cuts the nose edge portion 214 in two symmetrical portions. The corner 208 includes on the upper side 202 the chip former 215, which chip former includes a nose bottom surface 216, a primary main bottom surface 217, and a secondary main bottom surface 229.

Figure 7A:
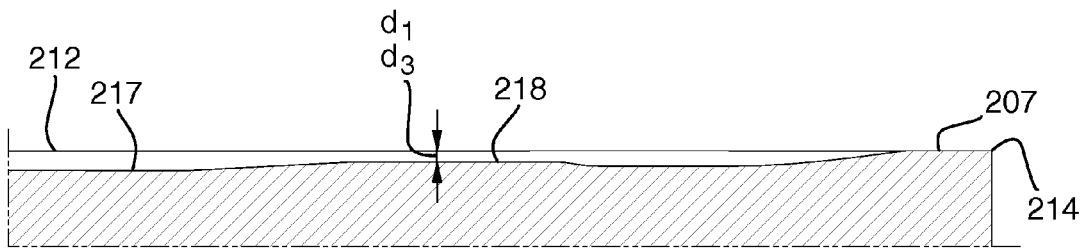
FIG. 7*a* is a schematic cross section along the line VIIa of FIG. 6*b*.
Figure 7B:
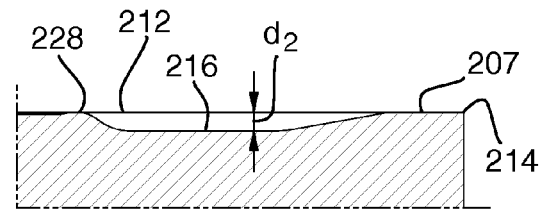
FIG. 7b is a schematic cross section along the line VIIb of FIG. 6b.
Figure 7C:
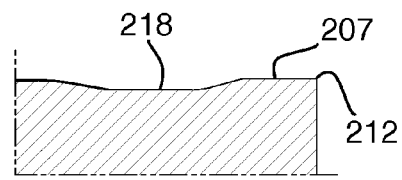
FIG. 7c is a schematic cross section along the line VIIc of FIG. 6b.
Figure 7D:
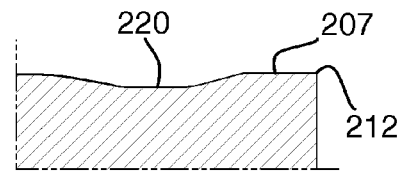
FIG. 7d is a schematic cross section along the line VIId of FIG. 6b.
Figure 7E:
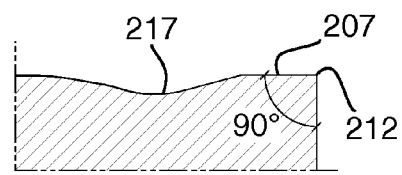
FIG. 7e is a schematic cross section along the line VIIe of FIG. 6b.

The nose bottom surface 216 is formed as a continuous surface with a lowest point lower than the level of the nose edge portion 214, as is clear from FIG. 7b. It is formed in the area behind the nose edge portion 214 and the land 207 along the bisector $Y_2$. The primary main bottom surface 217 extends on the inside of the land 207 along the primary edge portion 212. It is formed as a ditch with a lowest level being lower than the level of the primary edge portion 212 as shown in FIG. 7e and approximately at the same level as the nose bottom surface 216. In the region between the nose bottom surface 216 and the primary main bottom surface 217, separated from the bisector $Y_2$ and extending along the primary edge portion 212 on the inside of the land 207, a primary elevated bottom surface 218 is formed. The primary elevated bottom surface 218 has, as shown in FIGS. 7a and 7c, its lowest level lower than the primary edge portion 212 and the nose edge portion 214, but higher than the lowest point of each of the nose bottom surface 216 and the primary bottom surface 217.

The chip former 215 is symmetrical with respect to the bisector $Y_2$. It is thus formed with a secondary main bottom surface 229, a secondary elevated bottom surface 223 as well as a secondary intermediate bottom surface 224 and a secondary connection surface 225.

In this embodiment, the primary elevated bottom surface 218 is in the form of a substantially planar surface extending in a main extension plane parallel to the upper extension plane. It has two borderlines 218a, 218b being essentially parallel to the primary edge portion 212. The primary elevated bottom surface 218 thus has an extension in a direction perpendicular to the primary edge portion 212. The primary elevated bottom surface 218 is located entirely outside of a nose region 219 of the cutting insert, wherein the nose region 219 is defined in analogy with the nose region 119 previously described. The extension of the primary elevated bottom surface 218 is larger in a direction parallel to the primary edge portion 212 than in a direction perpendicular to the primary edge portion 212. Connecting the primary elevated bottom surface 218 and the primary main bottom surface 217 there is a primary intermediate bottom surface 220 formed in the same way as the primary intermediate bottom surface 120 in the first embodiment. Connecting the nose bottom surface 216 and the primary elevated bottom surface 218 there is a primary connection surface 221 in the form of a curved surface. The chip former 215 further includes a chip forming wall 222 extending in the region between the primary elevated bottom surface 218 and the primary main bottom surface 217 on the one hand, and a chip surface 226 formed at a level slightly below the upper extension plane on the other hand. In this embodiment, the upper cutting edge 206 is at the level of the chip surface 226 and the chip forming wall 222 is in the form of a sloping surface. The chip forming wall 222 does therefore not rise above the upper cutting edge 206, as can be seen in FIGS. 7c-e. However, in the region behind the nose bottom surface 216 along the bisector $Y_2$, a protrusion 228 is formed for chip forming at small cutting depths. The protrusion 228 extends above the chip surface 226.

In both the shown embodiments, the nose edge portion 114, 214 is located at the same level as the primary edge portion 112, 212 and the secondary edge portion 113, 213 with respect to the upper extension plane. Furthermore, the nose bottom surface 116, 216 and the primary main bottom surface 117, 217 are located at approximately the same level. It is of course also possible to design the cutting insert with e.g. a nose edge portion at a higher level than the primary edge portion. The primary elevated bottom surface 118, 218 is in the shown embodiments located at approximately half the distance between the level of the nose edge portion 114, 214 and the level of the nose bottom surface 116, 216 and the primary main bottom surface 117, 217. A distance $d_1$ measured in a direction parallel to the center axis from the lowest point of the elevated bottom surface 118, 218 to the level of the primary edge portion 112, 212 in both shown embodiments coincides with a distance $d_3$ from the highest point of the elevated bottom surface 118, 218 to the level of the primary edge portion 112, 212. A distance $d_2$ measured in a direction parallel to the center axis from the lowest point of the nose bottom surface 116, 216 to the level of the primary edge portion 112, 212 is approximately twice the distance $d_1$, $d_3$.

It is in both shown embodiments possible to define a circular sector in a plane parallel to the upper extension plane, wherein the circular sector is centered on the bisector $Y_1$, $Y_2$ and has the nose radius r of the nose edge portion 114, 214 as its radius and a central angle $\theta$. The central angle $\theta$ is chosen such that the nose bottom surface 116, 216 is at least partly located within the circular sector when seen in a top view as in FIGS. 4b and 6b respectively. The primary elevated bottom surface 118, 218 is in both shown embodiments located in a region outside of this circular sector. The bisector $Y_1$, $Y_2$ does thus not cut the primary elevated bottom surface 118, 218 and the secondary elevated bottom surface 123, 223 is separated from the primary elevated bottom surface 118, 218. In the first embodiment, the nose bottom surface 116 is entirely located within the circular sector, since it is located at a distance less than the nose radius r from the nose edge portion 114. In the second embodiment, the nose bottom surface 216 is only partly located within the circular sector.

Figure 8:
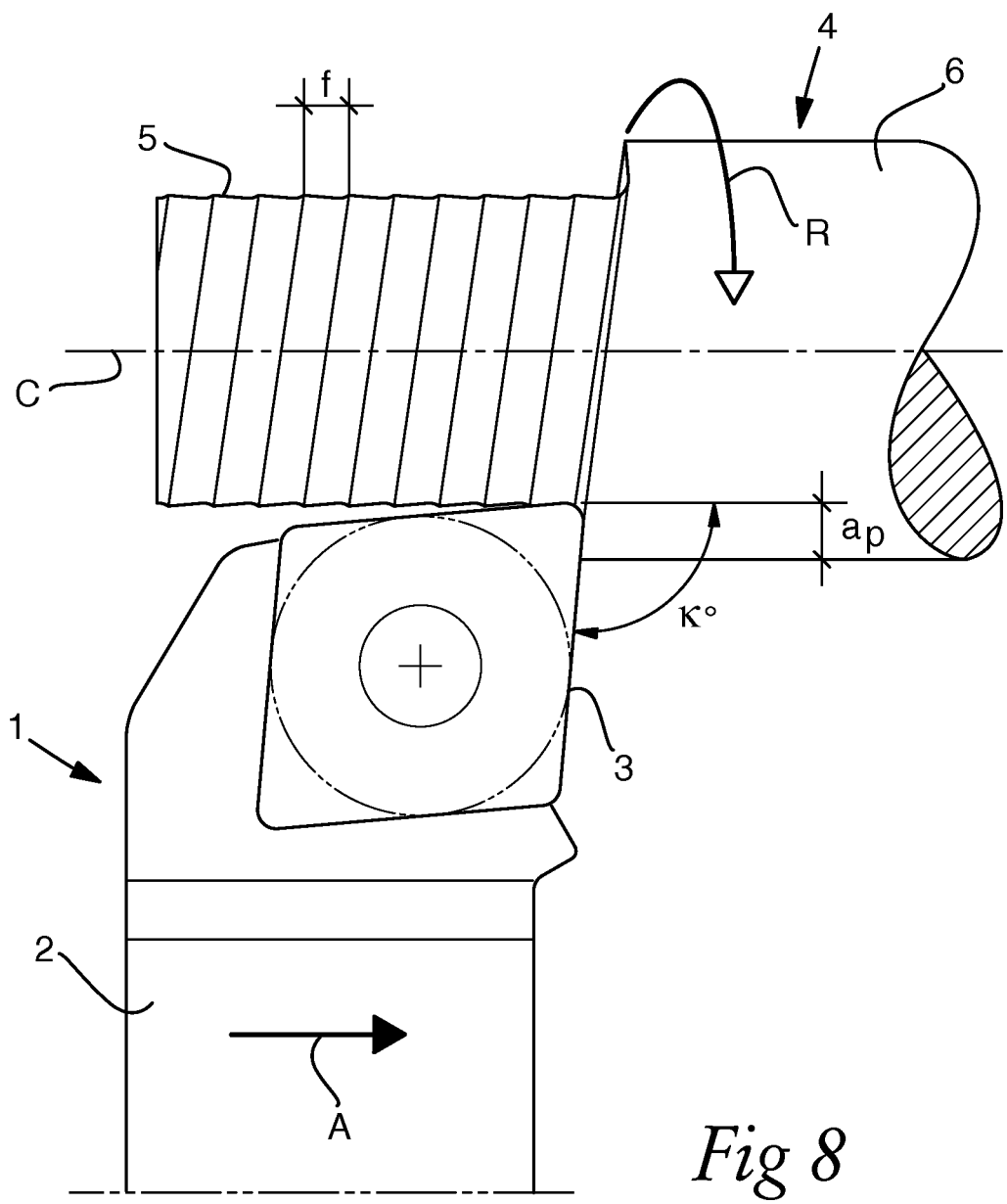
FIG. 8 is a schematic drawing of a turning tool according to the disclosure and a work piece.

The cutting inserts according to the present disclosure are configured for chip-removing machining of a metallic work piece 4 by means of turning when mounted in a turning tool 1, such as shown in FIG. 8. The tool includes a tool body 2 in the form of a bar and a replaceable cutting insert 3 according to the invention mounted in an insert seat of the tool. The work piece 4 is rotatable around an axis C and is shown to rotate in a direction R of rotation. A machined, cylindrical surface 5 of the work piece is schematically shown, with considerable exaggerated wave formations. The distance between the crests of the wave formation corresponds to the feed f of the cutting insert 3. The cutting depth $a_p$ is the cutting depths, i.e. the difference in radius between the machined surface 5 and the unmachined surface 6 as measured perpendicularly to the feeding direction A of the tool. The angle κ° is the so-called setting angle, which is the angle between the primary edge portion of the cutting insert and the feeding direction A.

The cutting inserts 100, 200 are manufactured from harder material than the tool body, such as hard metal, cemented carbide, ceramics, etc. The tool body may e.g. be manufactured from steel.

The present disclosure is not limited to the embodiments disclosed but may be varied and modified within the scope of the following claims. For instance, the cutting inserts are above described as indexable cutting inserts, but they may also be in the form of single sided cutting inserts. Furthermore, the cutting inserts may have any suitable shape, such as triangular, tetragonal, etc., with any suitable nose radius. The cutting inserts may have a positive or a negative basic shape. Additionally, the inserts may be of the kind having a combination of nose radii, such that the nose edge portion is not described by a single circular arc but rather as a combination of arcs.

The invention claimed is:

1. A cutting insert for turning comprising:
   an insert body having an upper side defining an upper extension plane, a lower side defining a lower extension plane parallel with the upper extension plane, wherein a center axis extends perpendicularly through the upper extension plane and the lower extension plane;
   a clearance surface extending around a periphery of the insert body connecting the upper side and the lower side;
   an upper cutting edge formed between the clearance surface and the upper side, said upper cutting edge extending around the upper side and forming at least a primary edge portion and a secondary edge portion connected by a nose edge portion such that the secondary edge portion is formed at an angle towards the primary edge portion; and
   a chip former formed on the upper side, said chip former including a nose bottom surface formed behind the nose edge portion along a bisector extending between the primary edge portion and the secondary edge portion, said nose bottom surface having a lowest point lower than a level of the nose edge portion, and a primary main bottom surface extending along the primary edge portion, said primary main bottom surface having a lowest point lower than a level of the primary edge portion, wherein the chip former further includes a continuous primary elevated bottom surface formed between the nose bottom surface and the primary main bottom surface, said primary elevated bottom surface extending along the primary edge portion, said primary elevated bottom surface having a lowest point lower than the level of the primary edge portion but higher than the lowest point of each of the nose bottom surface and the primary main bottom surface.

2. The cutting insert according to claim 1, wherein the primary elevated bottom surface is a planar or substantially planar surface.

3. The cutting insert according to claim 1, wherein the primary elevated bottom surface includes chip forming surface structure from the group of ridges, grooves, protrusions, pits, or the like.

4. The cutting insert according to claim 1, wherein the primary elevated bottom surface has a main extension plane which is parallel to the upper extension plane.

5. The cutting insert according to claim 1, wherein the primary elevated bottom surface has a main extension plane which is inclined with respect to the upper extension plane.

6. The cutting insert according to claim 1, wherein the primary elevated bottom surface has at least one borderline oriented parallel or substantially parallel to the primary edge portion.

7. The cutting insert according to claim 1, wherein the primary elevated bottom surface is located in a region outside of a circular sector centered on the bisector, the circular sector having a nose radius of the nose edge portion as its radius and a central angle, wherein the central angle is chosen such that the nose bottom surface is located at least partly within the circular sector.

8. The cutting insert according to claim 1, wherein, in a direction parallel to the center axis, a first distance from the level of the primary edge portion to the lowest point of the primary elevated bottom surface is 0.2-0.8 times a second distance from the level of the primary edge portion to the lowest point of the nose bottom surface.

9. The cutting insert according to claim 1, wherein, in a direction parallel to the center axis, a third distance from the level of the primary edge portion to a highest point of the primary elevated bottom surface is 0.2-0.8 times a second distance from the level of the primary edge portion to the lowest point of the nose bottom surface.

10. The cutting insert according to claim 1, wherein the primary elevated bottom surface has a largest extension in a direction parallel to the primary edge portion.

11. The cutting insert according to claim 1, wherein, in a plane parallel to the upper extension plane a shortest distance from the primary edge portion to the primary elevated bottom surface is shorter than a shortest distance from the primary edge portion to the nose bottom surface.

12. The cutting insert according to claim 1, wherein the chip former further comprises a chip forming wall extending along the primary edge portion and wherein the primary elevated bottom surface is located between the primary edge portion and the chip forming wall.

13. The cutting insert according to claim 1, wherein the primary elevated bottom surface and the primary main bottom surface are connected by a primary intermediate bottom surface extending between the primary elevated bottom surface and the primary main bottom surface in a plane which is inclined relative to the upper extension plane.

14. The cutting insert according to claim 1, wherein the primary elevated bottom surface extends from within a nose region (119) in the form of a circular sector centred on the bisector (Y1) and with the nose edge portion (114) as its arc.

15. The cutting insert according to claim 1, wherein the nose bottom surface (116, 216) is located at least partly within a nose region in the form of a circular sector centered on the bisector and with the nose edge portion as its arc.

16. A turning tool comprising:
    a tool body; and
    at least one cutting insert detachably mounted in an insert seat of the tool body, the at least one cutting insert including an insert body having an upper side defining an upper extension plane, a lower side defining a lower extension plane parallel with the upper extension plane, wherein a center axis extends perpendicularly through the upper extension plane and the lower extension plane; a clearance surface extending around a periphery of the insert body connecting the upper side and the lower side; an upper cutting edge formed between the clearance surface and the upper side, said upper cutting edge extending around the upper side and forming at least a primary edge portion and a secondary edge portion connected by a nose edge portion such that the secondary edge portion is formed at an angle towards the primary edge portion; and a chip former formed on the upper side, said chip former including a nose bottom surface formed behind the nose edge portion along a bisector extending between the primary edge portion and the secondary edge portion, said nose bottom surface having a lowest point lower than the level of the nose edge portion, and a primary main bottom surface extending along the primary edge portion, said primary main bottom surface having a lowest point lower than the level of the primary edge portion, wherein the chip former further includes a continuous primary elevated bottom surface formed between the nose bottom surface and the primary main bottom surface, said primary elevated bottom surface extending along the primary edge portion said primary elevated bottom surface having a lowest point lower than the level of the primary edge portion but higher than the lowest point of each of the nose bottom surface and the primary main bottom surface.

17. The cutting insert according to claim 8, wherein the first distance is 0.3-0.6 times the second distance.

18. The cutting insert according to claim 8, wherein the first distance is 0.4-0.6 times the second distance.

19. The cutting insert according to claim 9, wherein the third distance is 0.3-0.6 times the second distance.

20. The cutting insert according to claim 8, wherein the third distance is 0.4-0.6 times the second distance.

* * * * *